(12) United States Patent
Miyaji et al.

(10) Patent No.: US 6,940,581 B1
(45) Date of Patent: Sep. 6, 2005

(54) PRINTING SYSTEM

(75) Inventors: Kazuo Miyaji, Asaka (JP); Shigekazu Fukada, Tokyo (JP); Syusuke Mogi, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 769 days.

(21) Appl. No.: 09/584,845

(22) Filed: Jun. 1, 2000

(30) Foreign Application Priority Data

Jun. 4, 1999 (JP) ............................................. 11-157411

(51) Int. Cl.⁷ ............................................. G03B 27/32
(52) U.S. Cl. .......................... 355/40; 355/39; 355/41; 355/42; 355/43
(58) Field of Search ....................... 705/67, 40; 355/40, 355/39; 399/79

(56) References Cited

U.S. PATENT DOCUMENTS

| | | | | |
|---|---|---|---|---|
| 5,936,709 A | * | 8/1999 | Yamamoto | 355/40 |
| 5,974,401 A | * | 10/1999 | Enomoto et al. | 705/40 |
| 6,064,838 A | * | 5/2000 | Maruta et al. | 399/79 |
| 6,429,923 B1 | * | 8/2002 | Ueda et al. | 705/40 |

FOREIGN PATENT DOCUMENTS

| | | | | |
|---|---|---|---|---|
| GB | 2375867 A | * | 11/2002 | G07F/7/10 |
| JP | 7-230494 | | 8/1995 | G06F/17/60 |
| JP | 10-134232 | | 5/1998 | G07F/9/00 |
| WO | WO 02/097740 A1 | * | 12/2002 | G07F/7/10 |

OTHER PUBLICATIONS

Rik Drummond, signed, sealed, and delivered: Commercener Test Result, Network Computing, n817, 2003, PG 88.*
Micheal McNamara, Verifying Cores Ctches Coding Errors, Electronic Engineering Times, n1094, 2000, PG 68.*
Patent Abstracts of Japan 10134232 A May 22, 1998.
Patent Abstracts of Japan 07230494 A Aug. 29, 1995.

* cited by examiner

*Primary Examiner*—John W. Hayes
*Assistant Examiner*—Firmin Backer
(74) *Attorney, Agent, or Firm*—Sughrue Mion, PLLC

(57) ABSTRACT

An image medium is attached in an image input unit of a printing system, and an image to be printed and its number of prints are set through an operation panel. As contents of an order is determined, a credit card is inserted in an ID reading unit, and the printing system identifies a customer, and registers the order, then settles a payment. If the payment is done in cash, the printing system issues a magnetic card and the like on which a number is recorded for the customer to verify. The printing system has a plurality of container boxes for storing the printed material related to the customer's order by separating and keeping the printed material for each customer. A host unit verifies the properness of the person who comes to receive the prints by his/her credit card or the magnetic card and the like, and opens a corresponding outlet among the container boxes, so that the customer can receive his/her prints.

16 Claims, 6 Drawing Sheets

FIG. 2 (a)
FIG. 2 (b)
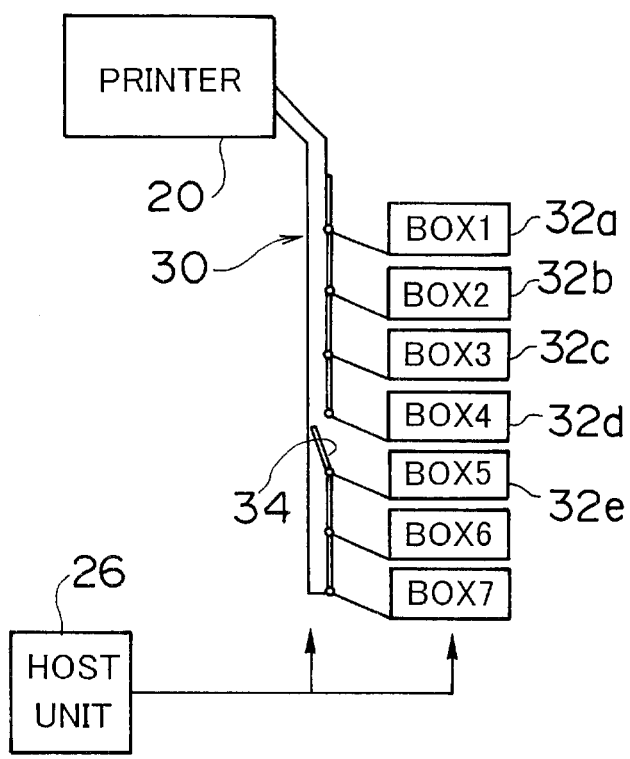
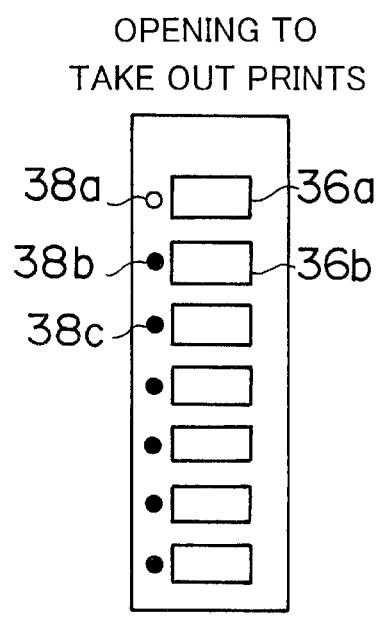

F I G. 6
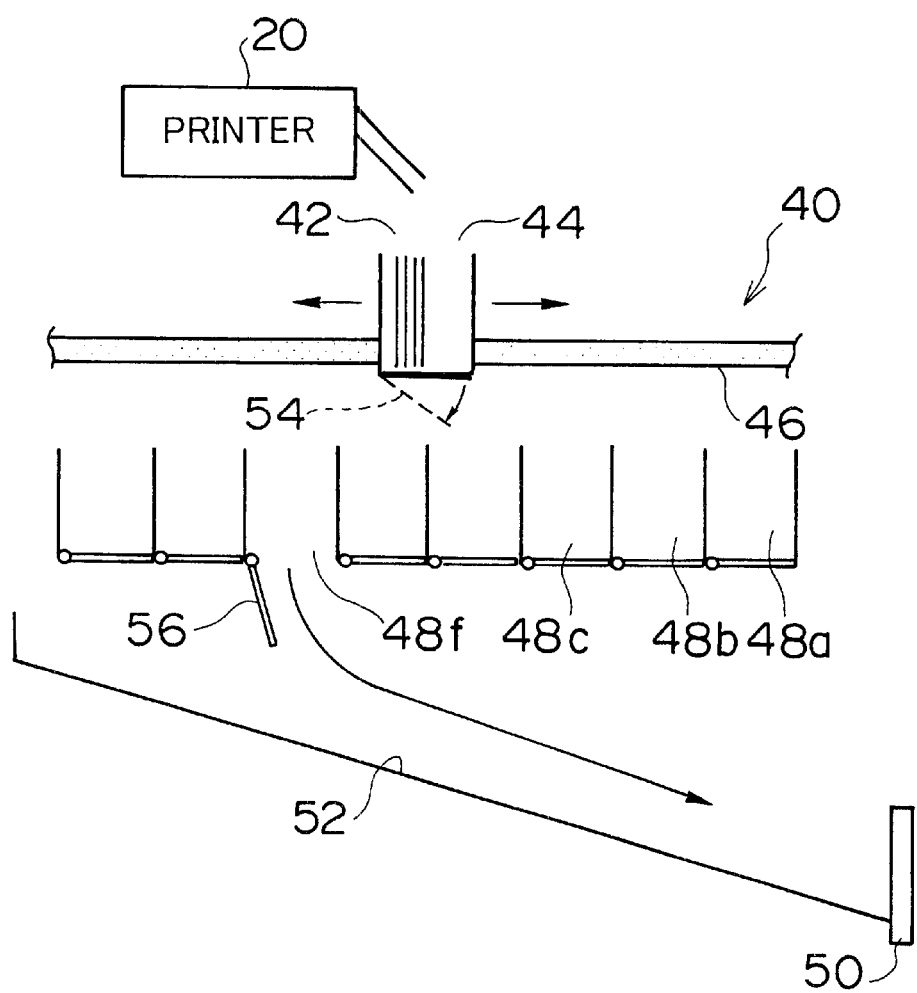

PRINTING SYSTEM

BACKGROUND OF THE INVENTION

1. Field of the Invention

The present invention relates generally to a printing system, particularly to a printing system for providing a service to print electronic image data that has been recorded in a recording medium such as a memory card, and also to a printing system suitable for making prints on the occasion of film processing.

2. Description of Related Art

Receiving an exposed photographic film from a customer and then providing a printing service at the same time as developing the film, has already been widely performed in this field of art. Moreover, a digital photographic print service is available, which accepts from a customer a memory card or another recording medium in which image data is recorded by using a digital camera and the like, and provides a recorded image to the customer as a print.

In such a print service, a salesperson at a counter receives a print order from the customer, and hands the produced prints to the customer in exchange for money. For this reason, it requires labor costs, and managing orders may cause problems. Considering such disadvantages, Japanese Patent Application Laid-open No. 10-134232 discloses a self-service system that automatically accepts printing order. As to a system to automate merchandise exchange, there is a disclosure in Japanese Patent Application Laid-open No. 7-230494.

However, a self-service photo finishing reception system conventionally suggested has a disadvantage in that a customer must stay and perform predetermined operations at the system until printing of a large number of prints such as prints on the occasion of film processing completes, and another customer must wait for a long time until the present customer finishes his/her printing.

SUMMARY OF THE INVENTION

The present invention has been developed in view of the above-described circumstances, and has as its object the provision of a printing system in which: a process through reception of a printing service to delivery of the prints is automated; also a person who ordered printing (orderer) can leave the printing system until the printing is completed; moreover many orders can be accepted quickly; and further, each customer can accurately receive his/her prints.

In order to achieve the above-described object, the present invention is directed to a printing system, comprising: a verification device which verifies properness, with respect to an orderer performing an order of a print, of a receiver receiving the print; an image input device which inputs image data to be printed according to the order; a printing device which makes the print in accordance with the image data inputted through the image input device; a container device which contains the print which is outputted from the printing device according to the order; and a delivery control device which keeps the print contained in the container device in an undeliverable state when the properness of the receiver is not verified by the verification device, and which allows the print to be in a deliverable state when the properness of the receiver is verified.

According to the present invention, the orderer inputs from the image input device the image data which is desired to print and the printing device prints the image data of the desired print on a medium such as a record sheet. The printed material, which is processed by the printing device, is contained in the container device. By control of the delivery control device, the printed material, contained in the container device, cannot be taken by a third person; only when the properness of the receiver with respect to the orderer is verified, the receiver can be provided the printed material. Thus, each customer can accurately receive his/her own printed material.

The printing system of the present invention can achieve a printing system in a self-operation type (self-service printing system) in which the orderer and the receiver operate the operation part of the system by him/herself in order to perform print ordering and a receipt of the printed material.

According to another embodiment of the present invention, the container device comprises a plurality of print containers, and the printing system further comprises: a memory device which records a place of one of the print containers that contains the print related to the orderer by associating with an information relating the orderer; and an auto sorting device which sorts, for each orderer, the print outputted from the printing device according to the order, and which keeps the print in the one of the print containers.

According to this embodiment, after a first customer orders printing, a next customer can immediately start a print order before printing related to the order of the first customer is completed. The printed material related to each orderer is sorted for each orderer by the auto-sorting device, and is contained in the corresponding print container. The system then verifies the properness of the receiver by the verification device, and provides the printed material from the print container of the verified receiver. Thereby each customer can accurately receive his/her prints.

According to another embodiment of the present invention, the printing system further comprises an identification code issuing device which issues an identification code when receiving the order, wherein the verification device verifies the properness of the receiver in accordance with the identification code issued by the identification code issuing device.

The customer can be verified by recording the identification code which is issued by the identification code issuing device in the recording medium (image medium) in which the image data to be printed is stored, whereby reattaching the medium to the system when receiving the printed material.

Preferably, the verification device comprises a reading device which reads a data recording medium in which identifying data of a customer is recorded, and verifies the properness of the receiver in accordance with the identifying data in the data recording medium.

When using the printing system of the present invention in provision of a self-service printing system, a settling device is preferably added, which requests payment to the customer for providing the printed material in accordance with a result of verification by the verification device, or the identifying data obtained by the identification code or the data recording medium.

Preferably, the printing system further comprises a delivery time providing device which provides information indicating estimated delivery time of the print related to the order. According to this embodiment, the orderer can leave the system and then return to the system at the estimated delivery time.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIGS. 2(a) and 2(b) are schematic constructional views showing examples of a sorting unit to which the printing system in FIG. 1 is applied;

FIG. 6 is a schematic constructional view showing another example of the sorting unit that is applied to the printing system in FIG. 1.

DETAILED DESCRIPTION OF THE PREFERRED EMBODIMENT

Hereunder preferred embodiments will be described in detail for a printing system with reference to the accompanying drawings.

Figure 1:
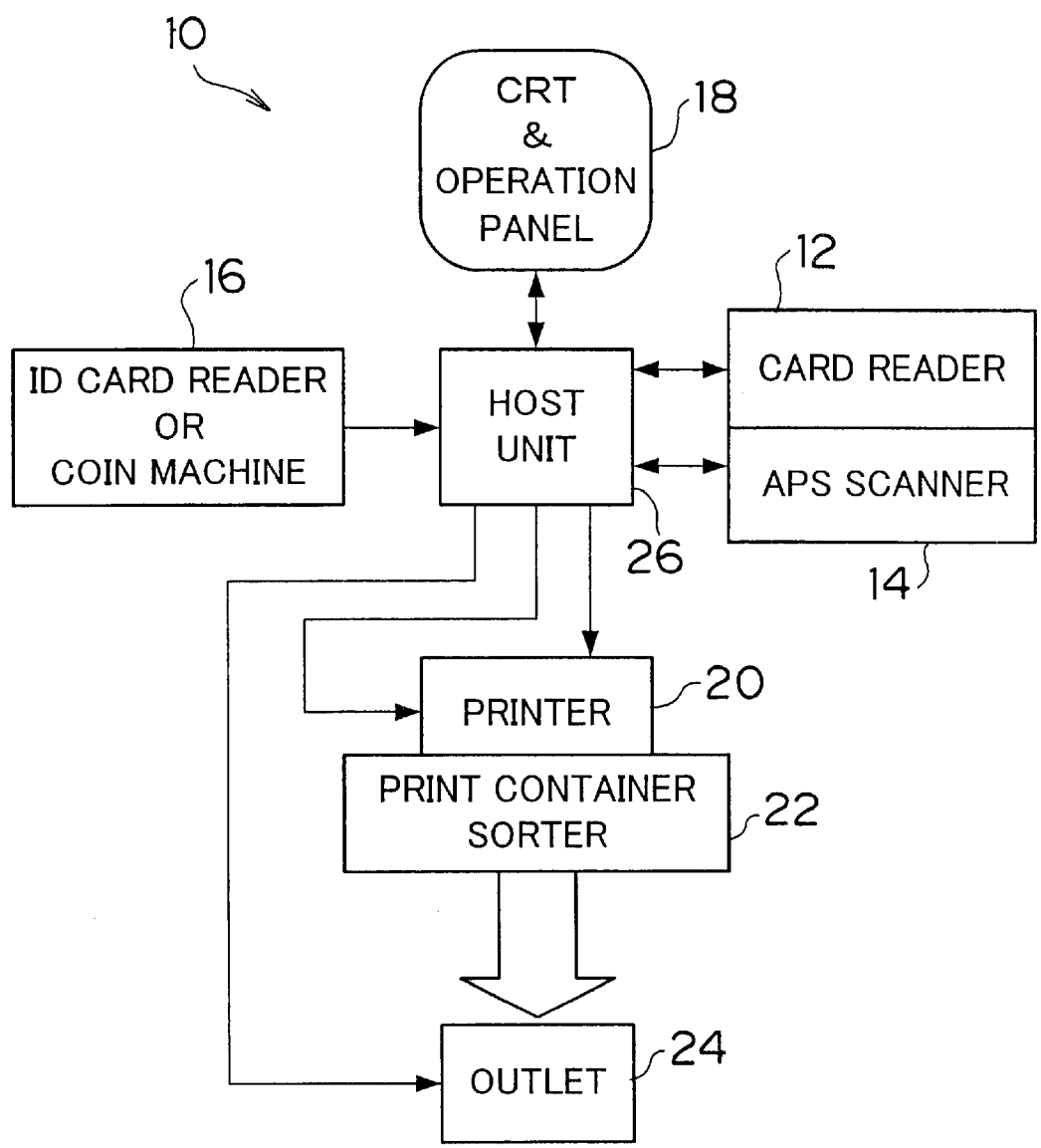
FIG. 1 is a block diagram showing a construction of a printing system to which the present invention is applied.

FIG. 1 is a block diagram showing a construction of a printing system 10 to which an embodiment of the present invention is applied. As shown in FIG. 1, the printing system 10 comprises: a card reader 12 and an APS film scanner 14, which are corresponding to a reading device of a print source; an ID reading unit 16 for reading data of a data recording medium such as an identification (ID) card and a credit card; a user interface 18 for performing selections and input by operations of a customer; a printer 20; a print container 22 for containing printed material; a print outlet 24; a host unit 26 for controlling each of these blocks; and so forth.

The card reader 12 is provided as one of image input devices and reads a recording medium such as a memory card and PC card in which the image data is recorded. A form of the recording medium is not to be limited in particular; the recording medium can be an IC memory card (Solid-State Floppy Disk Card) called a smart media, a flash memory card, a magnetic disk, an optical disk, a magnetic optical disk, a stick memory, and so forth. A reading unit corresponding to a recording medium is provided.

The APS film scanner 14 is provided as one of the image input devices, and converts and reads images taken in a photographic film used in a 24 mm advanced photographic film system (APS) into electronic image data through an imaging device. Attaching a developed film with a cartridge into a predetermined insertion part causes the film to be automatically loaded, and the film image is converted into electronic image data by an image sensor (not shown). A film scanner may be provided that is used for a 35 mm film or another type of film, instead of the APS film scanner 14, or in combination with the APS film scanner 14.

Other than the ones mentioned above, the image input device may include a flat-bed image reading unit to read an image script, a CD-ROM reading unit, a floppy disk reading unit, and so forth. The printing system has at least one of the above-mentioned various image input devices.

A block of the ID reading unit 16 includes a cash receipt machine (coin machine), which receives coins and paper money used to pay for the services of the printing system 10, calculates the received money and returns change.

The user interface 18 has a display device such as a CRT display or a liquid crystal display, and an operation panel. For example, a touch screen is provided to a display part of the display device, and various operations of the printing system are performed using the touch screen. The customer can proceed the operation by only touching buttons following the operation guide displayed on the screen of the display device.

The printer 20 prints, on a record sheet, an image that is inputted from the image input device such as the card reader 12 and the APS film scanner 14. A printing method of the printer 20 is not to be limited in particular; a printer in a various methods may be used such as a printing method called a Thermo Autochrome (TA) method, a heat transcription (melting/sublimation), a laser exposure heat developing transfer (pictorography), and a heat sensitive record method. The record sheet is not limited to paper that is cut in a predetermined size beforehand; a continuous sheet such as a roll sheet, or a sheet used as a sticker with an adhesion layer, are acceptable. The printing system 10 may also be constructed to select a record sheet in accordance with the operation of the user interface 18.

The print container 22 is a block to contain printed material that is outputted from the printer 20, and includes a container unit, which contains the printed material that is sorted for each customer by a sorter unit 30 (see FIG. 2) mentioned later, so that only the orderer (or a messenger of the orderer) can receive his/her printed material. The print output 24 has an outlet for delivering to the customer (the orderer) the printed material.

The host unit 26 is a processing unit that supervises the entire system, and constructed with a computer. The host unit 26 gives various instructions to process the image data, to receive and send the image data to the printer 20, and to execute printing. The instructions to processes with regard to the host unit 26 are given from the user interface 18 in accordance with the customer's operation.

Briefly describing an operation of the printing system 10, the customer inserts into the card reader 12 a memory card (not shown) in which the image data is recorded, and specifies an image or images to be printed and a number of prints by operating the user interface 18. In case of the APS film, the customer attaches a developed APS film cartridge (not shown) to the APS film scanner 14, and specifies an image or images to be printed and the number of prints by operating the user interface 18.

As contents of the order are determined, the customer registers the reception of the order and determines an appropriate payment for the service using a medium that includes data to identify the customer (identifying data) such as a credit card, a debit card, or a membership card (hereunder these media will be called an ID card). At this point, the host unit 26 stores the data of the ID card (ID data) in association with the ordered image data. The ID data is effectively used at verifying the properness of the receiver with respect to the orderer when delivering the printed material.

In a case that a card for payments such as the credit card is not used (i.e., in cash transaction), the host unit 26 issues an receipt number for every receipt of an order, and records the receipt number data into the image medium (such as the memory card or the APS film cartridge) of the orderer. When the receiver attaches the same memory card or the APS film cartridge to receive the printed material, the order number data is read and the host system 26 verifies the receiver in accordance with the data. A magnetic card or a receipt confirmation ticket in which the receipt number data is recorded may be issued as another means for verifying the customer.

As to delivering of the printed material, the printing system 10 has a plurality of outlets for example, and sorts out for each customer the printed material related to the order, then keeps the printed material. When the receiver re-attaches the ID card or the image medium in which the receipt number data is recorded to receive the printed material, the host unit 26 opens the corresponding outlet in which the printed material related to the verified receiver. Thus, the customer can take out his/her own printed material. The embodiment is described in detail with reference to FIG. 2.

FIGS. 2(a) and 2(b) show an example of a sorter unit (hereunder called a sorter) applied to the printing system 10. As shown in FIG. 2(a), the sorter 30 for sorting out the printed material for each orderer is provided to the output part of the printer 20. The sorter 30 has a plurality of container boxes 32a, 32b, . . . , each of which is provided with a movable sorting door 34 for selectively guiding the printed material outputted from the printer 20 into the container boxes 32a, 32b, . . . .

The sorting doors 34 are opened and closed in accordance with a command from the host unit 26. The host unit 26 stores the identifying data of the orderer by corresponding the data with the numbers of the container boxes 32a, 32b, . . . , and controls the sorting doors 34 so that the printed material is kept in the corresponding container box for each orderer (e.g. the printed material for an orderer A is contained in the container box 32e, which is located at the fifth place from the top in FIG. 2).

FIG. 2(b) shows the outlets of each of the container boxes 32a, 32b, . . . . As shown in FIG. 2, the container boxes 32a, 32b, . . . are provided with doors 36a, 36b, . . . for taking out, each of which is provided with a lock device. The doors 36a, 36b, . . . are separately locked and unlocked under the control of the host unit 26, and are normally locked. When the host unit 26 verifies the person who comes to receive the printed material with the ID card, only the door (e.g. the reference number 36a) of the container box is unlocked in which the printed material of the verified customer is contained (e.g. the container box 32a corresponding to an orderer B), and the contained printed material can be taken out.

Lamps 38a, 38b, . . . are provided at the proximity of the doors 36a, 36b, . . . , respectively. The host unit 26 turns on or blinks the lamp (e.g. the lamp 38a) of the door (e.g. the door 36a) of the container box that is in a deliverable state, so as to notify the customer the place of the corresponding container box. A device for notifying the customer the place to take out the printed material is not limited to the lamps 38a, 38b, . . . ; for example, a picture showing the place to take out may be displayed on the display device of the user interface 18, or an audio message may be outputted.

Figure 3:
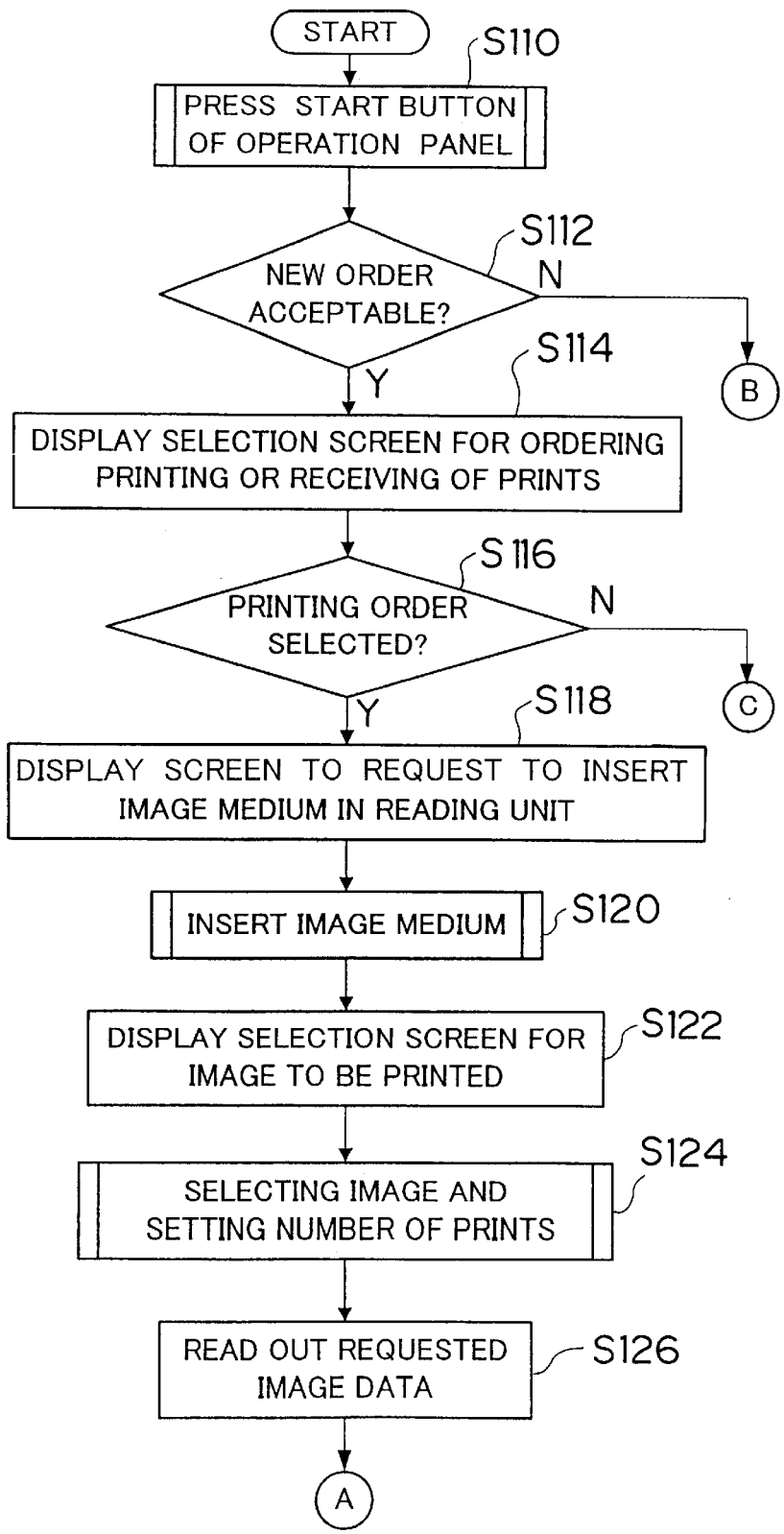
FIG. 3 is a flowchart illustrating an operation procedure of the printing system in an embodiment of the present invention.
Figure 4:
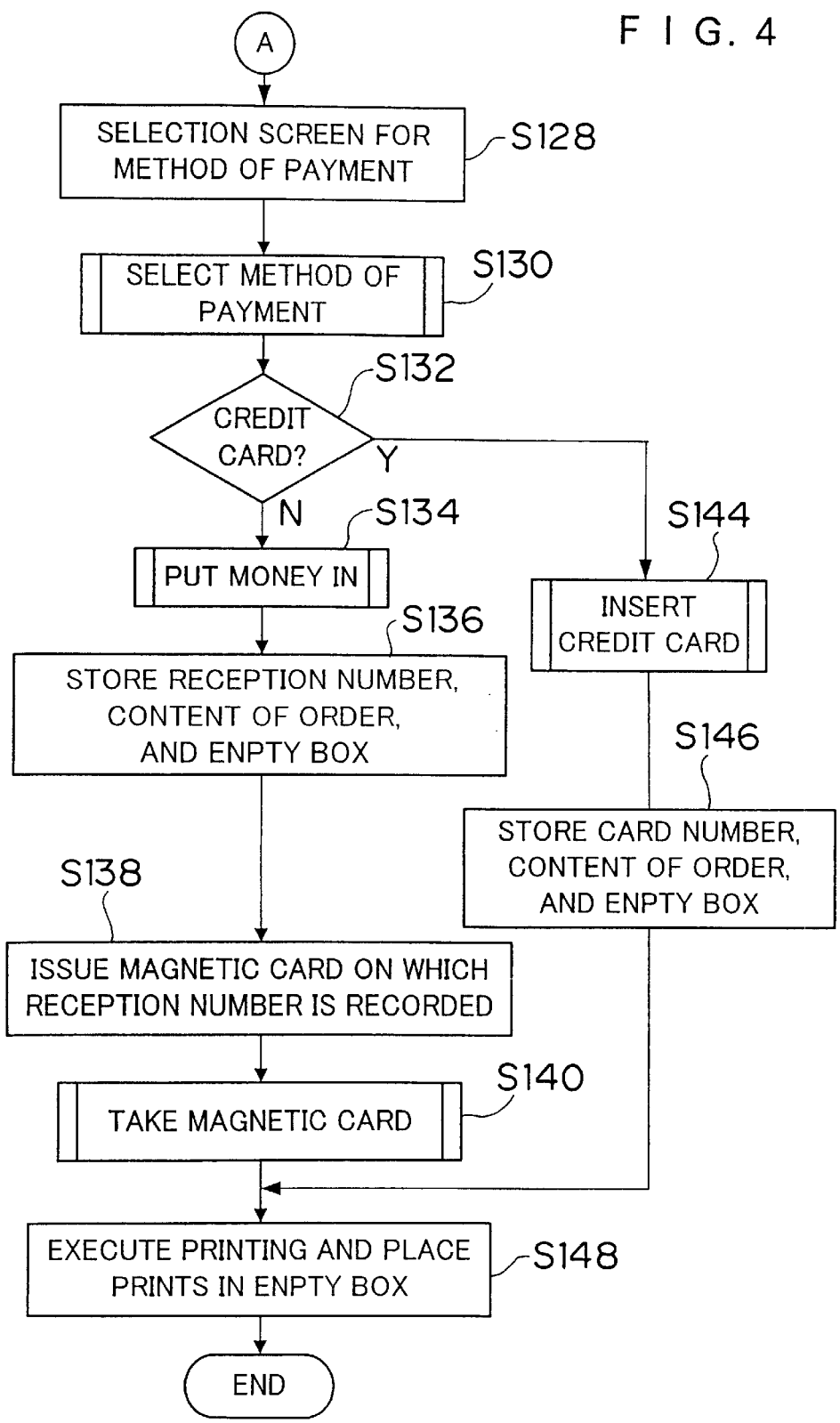
FIG. 4 is a flowchart illustrating an operation procedure of the printing system in the embodiment of the present invention.
Figure 5:
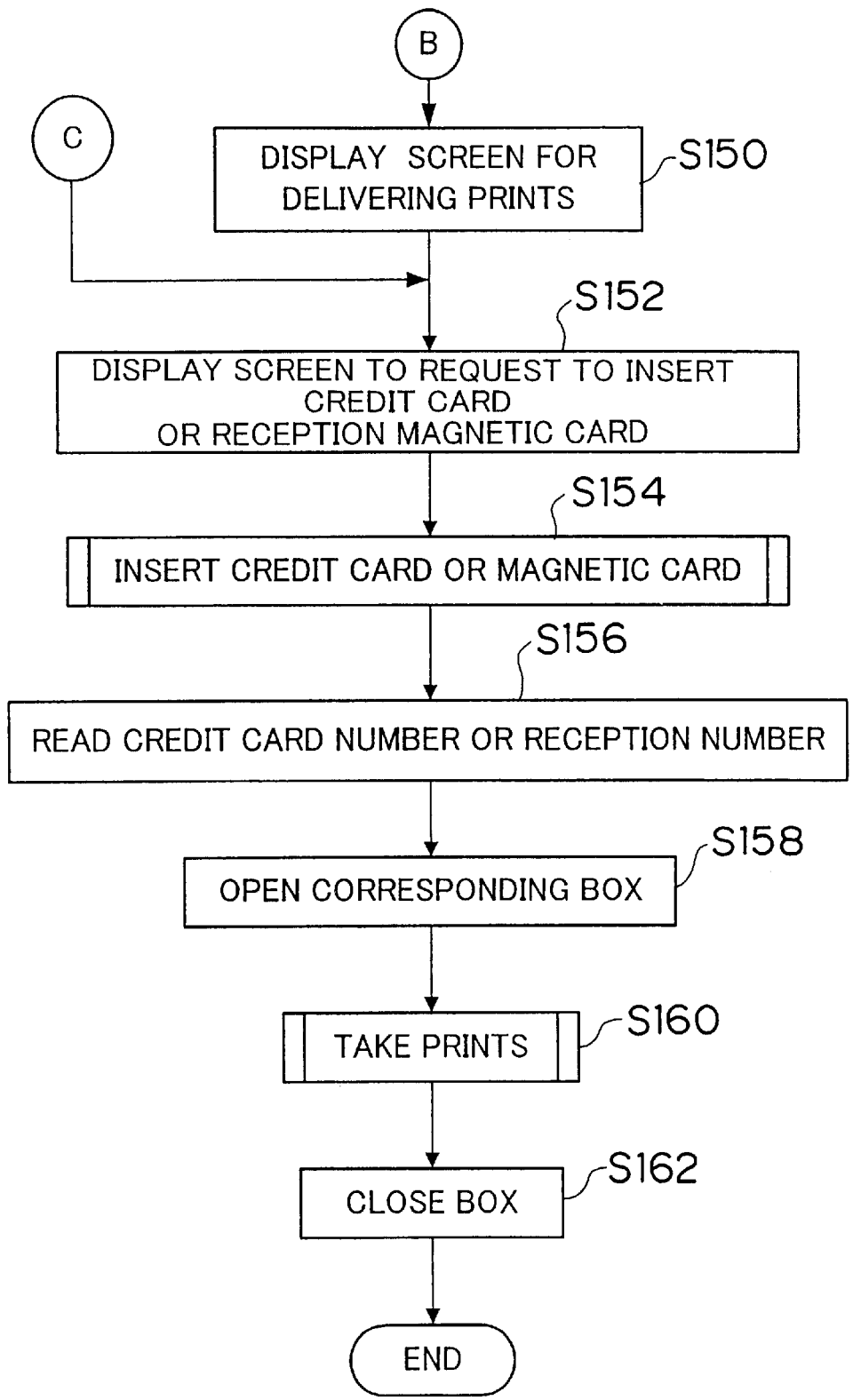
FIG. 5 is a flowchart illustrating an operation procedure of the printing system in the embodiment of the present invention.

FIGS. 3–5 are flowcharts showing the operation procedure of the printing system 10 of the present embodiment. In the process shown in these drawings, processes shown with two vertical lines at both ends (e.g. steps S110 and S120) are operations or actions of the customer.

When ordering the printing and receiving of the printed material by using the printing system 10 of the present embodiment, the customer first presses a start button of the operation panel of the user interface 18 (step S110). The host unit 26 understands a state of the printing system 10, and determines whether or not a new order is acceptable (step S112). For example, if there is no empty box in the container boxes 32a, 32b, . . . , it is determined that the new order is not acceptable. If the new order is not acceptable, the process jumps to step S150 shown in FIG. 5, which will be mentioned later.

If the new order is acceptable at the step S112 in FIG. 3, a selection screen for inquiring to the customer whether he/she would like to order printing or would like to receive prints (step S114).

On the selection screen, the customer selects one of the desired processes by operating the operation panel. The host unit 26 determines whether or not the customer selects the print order (step S116). If the customer selects receiving the prints, the process jumps to step S152 in FIG. 5, which will be mentioned later.

If the print order is determined to be selected at step S116 in FIG. 3, the host unit 26 displays on the screen to require inserting the memory card or another image medium in which the image data is recorded, into the reading unit (e.g. the card reader 12) (step S118).

As the customer inserts the memory card (not shown) into the card reader 12 (step S120) according to the displayed screen, a selection screen of the image to be printed is displayed on the display unit of the user interface 18 (step S122). On the selection screen of the image to be printed, all the image files recorded in the memory card are displayed on a table.

The customer selects the image to be printed and sets the number of prints while looking at the displayed table on the display unit (step S124). As the customer finishes the image selection and the setting of the number of prints, the host unit 26 reads out from the image medium the image data corresponding with the print request (step S126). If the printing data reciting the contents of the print order has been recorded in the memory card, the contents of the order can be inputted by reading the printing data; thus the step S124 can be omitted.

Next, the process goes on to step S128 in FIG. 4, and a selection screen for a method of payment for the print service is displayed (step S128). There are a variety of methods for payments such as a deferred payment with a credit card or a membership card, cash, a prepaid card, or a service ticket (complimentary ticket); in the present embodiment, either the cash payment or the credit card payment is selected.

The customer operates the user interface 18 to select the method of payment (step S130). As the customer selects the method of payment, the host system 26 determines whether or not the payment by the credit card is selected (step S132). If the payment by cash is selected, the host system 26 is in a standby mode in order to receive the money in the coin machine. At this point, the display unit may display contents to require to the customer to put money in.

As the customer puts a predetermined amount of money into the coin machine (step S134), the host unit 26 records the reception number and the place of an empty container box (box number) for containing the printed material (step S136). A job for printing process is thus registered in the host unit 26. Then, the magnetic card on which the reception number is recorded is issued (step S138). The magnetic card is used as a device for verifying the customer when the customer receives the prints. The customer takes the magnetic card (step S140), then can leave the printing system 10.

As described above, the printing job, registered in the host unit 26, is executed sequentially in accordance with an order of reception (step S148). The printed material obtained by the printing process is kept in each of the corresponding container boxes 32a, 32b, . . . . The system may be constructed in which the order of execution of the printing process can be changed by a certain operation by the customer. Reception of the print order and the execution of the printing can be processed at the same time; thus after the host unit 26 accepts an order of one customer, it can immediately accept an order of another customer.

If the payment by the credit card is selected in the determination of payment method at step S132, the host unit 26 stands by for the insertion of the credit card into the ID reading unit 16. At this point, the display unit may display to the customer for requiring the insertion of the credit card. As the customer inserts the credit card into the predetermined card insertion part (step S144), the host system 26 stores the card number, the contents of the order, and the place of the empty box for containing the printed material (step S146). In case of the credit card, the identity of the orderer and the receiver can be verified with the credit card, so that the issue of the magnetic card can be omitted. After step S146, the process goes on to step S148. The host unit 26 sequentially executes the printing, and places the printed material in the corresponding container boxes (step S148).

If a new order is determined to be unacceptable at step S112 in FIG. 3, the process diverges into the step S150 in FIG. 5, and the host unit 26 displays the screen for delivering the prints. Next, the host unit 26 displays a screen to request the insertion of the credit card or the magnetic card that was issued when the order was accepted (step S152). In the case that the receiving prints is selected at step S116 in FIG. 3, the process jumps to step S152 in FIG. 5.

As the customer inserts into the ID reading unit 16 the credit card or the magnetic card (step S154), the host unit 26 reads the number of the credit card or the reception number of the magnetic card (step S156). Then, the host unit 26 unlocks the door (e.g., the door 36a in FIG. 2) of the corresponding container box (e.g. the box 32a in FIG. 2), so as to automatically open the container box (step S158). The customer takes out the printed material related to his/her order from the container box (step S160). After that the host unit 26 closes the door (step S162), and the delivering process is completed.

As a variation of the embodiment described above, a reception confirmation ticket on which bar codes or similar identification codes are written is issued instead of the magnetic card, and the bar codes of the reception confirmation ticket is read by a device such as a code reader, so that, when delivering the prints, the properness of the receiver can be verified. Moreover, the customer may set his/her own code number or a password by him/herself through the user interface 18, or the host unit 26 may automatically issue the code number or the password for the customer when accepting the print order. In such a case, outputting the code number or the password is preferably printed on the reception confirmation ticket.

Another variation is also preferable in which the estimated time to finish printing is automatically printed on the reception confirmation ticket, which is issued on the acceptance of the order. The host unit 26 understands the states of all the print orders and the states of the print execution, and can estimate the time to finish printing related to the new order. By presenting the estimated time calculated as mentioned above to the customer, the customer can effectively use the time until the receiving.

In another variation, a lock is provided to each of the container boxes 32a, 32b, . . . , and the customer is given a key of the corresponding box at the reception, and the customer can open the door of the box as receiving the prints. In this case, the key is a device to verify the customer.

FIG. 6 shows another embodiment of the present invention. In this embodiment, a sorter 40 in FIG. 6 is used instead of the sorter 30 in FIG. 2.

The sorter 40 comprises a movable box 44 for receiving printed material 42, which is outputted from the output part of the printer 20, a moving mechanism 46 for movably supporting the movable box 44, a plurality of container boxes 48a, 48b, . . . , which are arranged at the bottom part of the movable box 44, a paper slope 52 for guiding the printed material 42, which falls from each of the container boxes 48a, 48b, . . . to an opening 50 to take out prints, and so forth.

A door 54 to be opened and closed is provided at the bottom face of the movable box 44, and the door 54 is opened and closed in accordance with instructions from the host unit 26. The moving mechanism 46 includes a motor (not shown), which is the power source, and a sensor for determining a place of the movable box 44, and the host unit 26 controls the place of the movable box 44.

A doors 56 to be opened and closed is provided to the bottom face of each of the container boxes 48a, 48b, . . . . Each of the doors 56 is opened and closed in accordance with instructions from the host unit 26. The paper slope 52 and the opening 50 to take out prints are shared by the container boxes 48a, 48b, . . . , and the printed material 42 is taken out through the opening 50 by the customer.

An operation of the above-described sorter is as follows. At print output, the movable box 44 is placed at the predetermined place (initial place) at the bottom of the output part of the printer 20, and receives the printed material 42 outputted from the printer 20. At this point, the door 54 at the bottom face of the movable box 44 is closed. When printing is finished, the movable box 44 moves to the place of a container box (e.g. 48f) that is designated to contain the printed material 42. When the movable box 44 is placed above the designated container box (48f), the door 54 at the bottom of the movable box 44 is opened, and the printed material 42 is dropped in the designated container box (48f). At this point, the door 56 of the container box (48f) is closed.

As the customer who comes to receive the printed material inserts the credit card or the magnetic card issued at the time the order was accepted, the host unit 26 reads the data recorded in the card and opens the door 56 at the bottom of the container box (48f) that corresponds with the read data. Thereby, the printed material 42 contained in the container box (48f) falls on the paper slope 52, and is transported to the opening 50 along the slope 52. Accordingly, each orderer can accurately receive the printed material related to his/her order through the opening 50.

As a further variation of the present embodiment, the printing system 10 described with FIG. 1 may be connected with a network using a communication network such as a telephone line, and the image data to be printed is directly transferred to the host unit 26 of the printing system 10 by the customer using a personal computer (PC) or other communication equipment so as to input the image data. In this embodiment, the image medium such as the memory card is unnecessary.

When verifying the properness of the customer at the time of delivering by using the credit card or the membership card, various personal data of the customer can be obtained from the card. A telephone call, a facsimile, an electronic mail, and so forth, with a message to take the prints may be automatically delivered by the host unit 26 to the customer who has not taken the prints after a certain period of time after printing is finished.

According to the present invention described above, the printing system is constructed to verify the properness of the receiver who receives the printed material with respect to the customer who ordered printing, and to keep the printed material by the container device to prevent the third person from taking out the printed material; hence, a self-service printing system can be achieved. Moreover, because the third person cannot take out the printed material, the customer can leave the system after a print order until the printing is finished.

Moreover, according to the present invention, the plurality of print containers are provided as well as the auto-sort device for sorting out the printed material for each customer; thus many orders can be accepted quickly, and each customer can accurately receive his/her prints.

Further, according to the present invention, the customer can accurately receive the printed material related to his/her order without his/her prints being seen by the third person.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A printing system comprising:
   a verification device which verifies properness, with respect to an orderer performing an order of a print, of a receiver receiving the print;
   an image input device which inputs image data to be printed according to the order;
   a printing device which makes the print in accordance with the image data inputted through the image input device;
   a container device which contains the print which is outputted from the printing device according to the order, wherein the container device comprises a plurality of print containers, and the printing system further comprises;
   a delivery control device which keeps the print contained in the container device in an undeliverable state when properness of the receiver is not verified by the verification device, and allows the print to be in a deliverable state when the properness of the receiver is verified;
   a memory device which records a place of one of the print containers that contains the print related to the orderer by associating with an information relating to the orderer; and
   an auto sorting device which sorts, for each orderer, the print outputted from the printing device according to the order and which places and keeps the print in one of the print containers.

2. The printing system as defined in claim 1, further comprising:
   an identification code issuing device which issues an identification code when receiving the order,
   wherein the verification device verifies the properness of the receiver in accordance with the identification code issued by the identification code issuing device.

3. The printing system as defined in claim 2, wherein the identification code is recorded in a recording medium that contains the image data.

4. The printing system as defined in claim 1, wherein the verification device comprises a reading device which reads a data recording medium in which identifying data of a customer is recorded, and verifies the properness of the receiver in accordance with the identifying data in the data recording medium.

5. The printing system as defined in claim 1, further comprising a settling device which requests to a customer a payment for the print in accordance with a result of the verification by the verification device.

6. The printing system as defined in claim 2, further comprising a settling device which requests to a customer a payment for the print in accordance with the identification code.

7. The printing system as defined in claim 4, further comprising a settling device which requests to the customer a payment for the print in accordance with the identifying data obtained through the data recording medium.

8. The printing system as defined in claim 1, further comprising a delivery time providing device which provides information indicating estimated delivery time of the print related to the order.

9. A self-service printing system comprising:
   a verification device which verifies properness, with respect to an orderer performing an order of a print, of a receiver receiving the print;
   an image input device which inputs image data to be printed according to the order;
   a printing device which makes the print in accordance with the image data inputted through the image input device;
   a plurality of containers each having a door with an opening and closing mechanism so that each container selectively performs at least one of acceptance of the print outputted from the printing device and discharge of the print outputted from the printing device; and
   a delivery control device which keeps the print contained in at least one of the containers in an undeliverable state when properness of the receiver is not verified by the verification device, and allows the print to be in a deliverable state when the properness of the receiver is verified.

10. The printing system as defined in claim 1, further comprises:
    a memory device which records a place of one of the containers that contains the print related to the orderer by associating with an information relating the orderer; and
    an auto sorting device which sorts, for each orderer, the print outputted from the printing device according to the order, and which keeps the print in the one of the containers.

11. The system of claim 10, wherein the sorting device automatically and selectively opens the door of the plurality of containers to deposit prints in respective containers based on information relating to the orderer.

12. The system of claim 10, wherein the storing device comprise a primary container receiving prints outputted from the printer, said primary container movably supported relative to the plurality of containers to selectively deposit the print to one of the plurality of containers based on information relating to the orderer.

13. The system of claim 12, wherein the primary container is disposed downstream of the printing device to directly receive prints output from the printing device.

14. The system of claim 9, wherein the plurality of containers are located downstream of the printing device to directly receive prints outputted by the printing device.

15. The system of claim 14, wherein each container includes a second door and second opening and closing mechanism, wherein one of the opening and closing mechanism operates the door to accept prints into the container and the other of the opening and closing mechanism operates the second door to permit discharge of prints from the container.

16. The system of claim 9, further comprising a device for judging whether an additional order can be received based on whether at least one of the plurality of containers is vacant.

* * * * *